United States Patent [19]
Dornetta

[11] Patent Number: 5,632,230
[45] Date of Patent: May 27, 1997

[54] ANIMAL PERCH AND METHOD OF CONSTRUCTION

[76] Inventor: Ronald Dornetta, 3717 Linden Ave., Pittsburgh, Pa. 15234

[21] Appl. No.: 568,119

[22] Filed: Dec. 6, 1995

[51] Int. Cl.⁶ .................................................. A01K 31/12
[52] U.S. Cl. ........................................ 119/537; 119/57.8
[58] Field of Search ............................. 119/537, 57.8, 119/464, 468, 469, 467, 480, 786

[56] References Cited

U.S. PATENT DOCUMENTS

| | | |
|---|---|---|
| 76,406 | 9/1868 | Leon . |
| 787,922 | 4/1905 | Hoxie et al. . |
| 910,298 | 1/1909 | Lindemann ........................... 119/537 |
| 1,217,606 | 2/1917 | Kane .................................. 248/163.1 |
| 4,492,354 | 1/1985 | Rice .................................. 248/163.1 |
| 4,627,384 | 12/1986 | Courteau ........................... 119/537 |
| 4,695,021 | 9/1987 | Leinfelder ........................... 248/168 |
| 5,022,349 | 6/1991 | Bryant et al. ...................... 119/57.8 |
| 5,165,365 | 11/1992 | Thompson ......................... 119/786 X |
| 5,218,927 | 6/1993 | Addams ............................. 119/537 |
| 5,381,758 | 1/1995 | Simon ................................ 119/537 |
| 5,511,512 | 4/1996 | Pintavalli et al. .................. 119/468 |

*Primary Examiner*—Robert P. Swiatek
*Assistant Examiner*—Yvonne R. Abbott
*Attorney, Agent, or Firm*—Carothers & Carothers

[57] ABSTRACT

An animal perch is constructed from a conventional camera tripod which has three upwardly converging legs that support a vertical post above their point of convergence. A litter tray for the perch is constructed by providing a large tray with a central opening that is sized for passing over the support post and resting on top of the converging legs for support. A horizontal perch bar is then secured to the upper end of the vertical support post for the animal to perch on. Cups may also be secured to the perch bar for food and water for the animal.

4 Claims, 1 Drawing Sheet

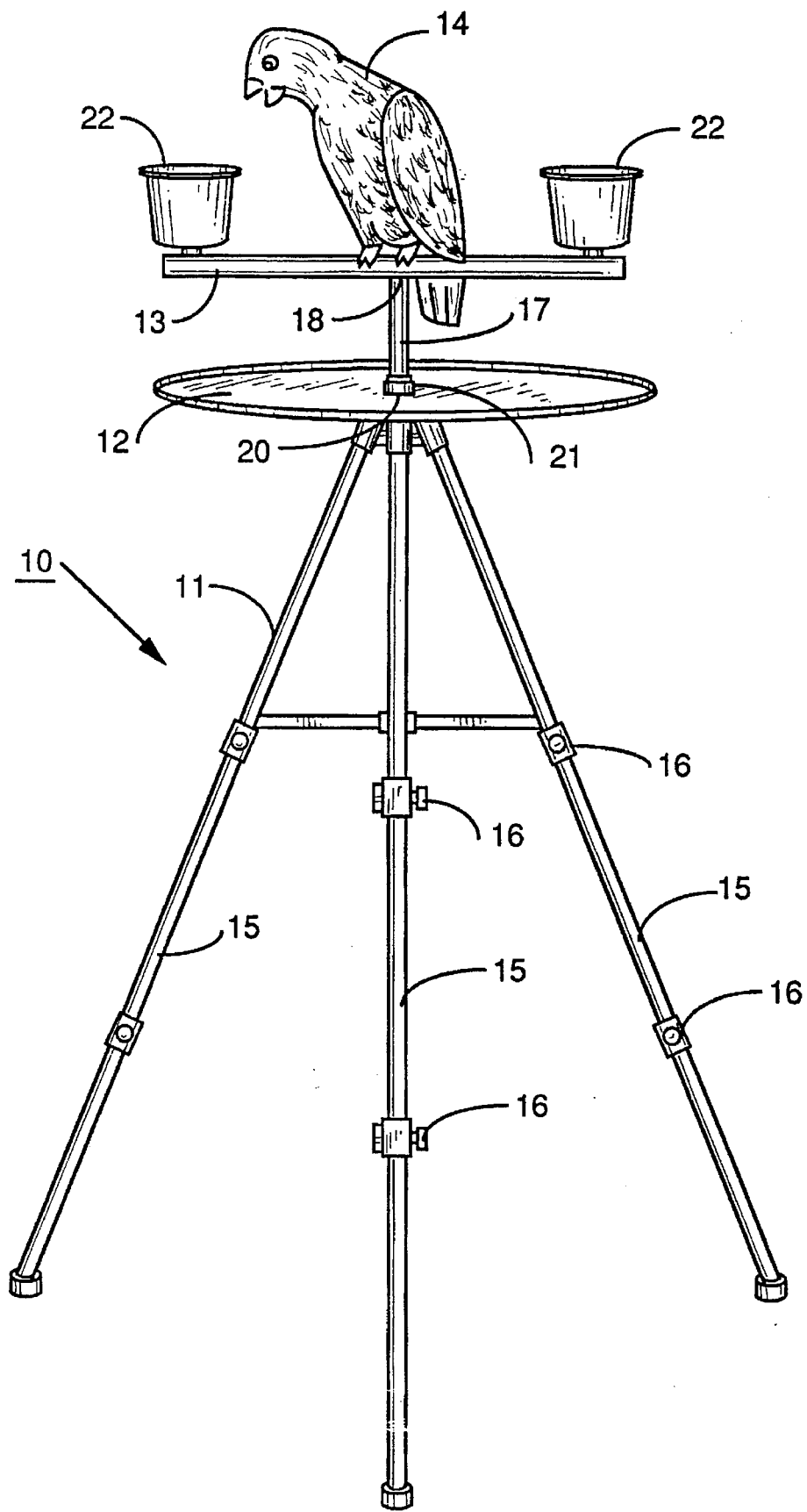

ANIMAL PERCH AND METHOD OF CONSTRUCTION

FIELD OF THE INVENTION

The present invention pertains to an animal perch and more particularly to an animal perch which is readily constructed with the use of a conventional collapsible camera tripod.

BACKGROUND OF THE INVENTION

Animal perches tier house pets, such as parrots or monkeys, are not readily available on the market and they are expensive.

It is a principal object of the present invention to readily construct an animal perch using a conventional camera tripod.

SUMMARY OF THE INVENTION

The animal perch of the present invention is constructed from a conventional camera tripod which is adapted to support a camera or other optical devices, such as a telescope. Such camera tripods generally have three upwardly converging legs which are telescoping and adjustable in length. The legs support a vertical post above their point of convergence and the camera or other optical device is usually secured to the upper end of this support post.

A litter tray is constructed from a conventional tray, such as a large circular tray, and a central opening is cut or otherwise provided in the tray and made of a proper diameter for passing over the support post and thereafter permitting the tray to rest on the converging legs for support.

After the litter tray is put in place, then a horizontal perch bar is secured to the upper end of the support post to provide a perch tier the animal.

The perch bar is preferably constructed of wood and may be attached to the upper end of the support post in any conventional manner. For example, the perch bar may be centrally drilled at right angles to slip over the upper or top end of the support bar.

As an alternative, the conventional securing device normally found on top of the support bar for attaching a camera or similar optical device can also be used to secure the perch bar.

One or more cups may also be secured to the perch bar, preferably at its outer ends, to contain feed and water for the pet.

BRIEF DESCRIPTION OF THE DRAWING

Other objects and advantages will become apparent in the following description and claims. The accompanying drawing shows, for the purpose of exemplification, without limiting the scope of the claims, certain practical embodiments of the invention. The drawing shows a perspective view in side elevation of the animal perch constructed in accordance with the teachings of the present invention.

DETAILED DESCRIPTION OF THE DRAWING

Referring to the drawing, the animal perch 10 illustrated is comprised basically of a conventional and adjustable camera tripod 11, a litter tray 12 and a horizontal perch bar 13 for the parrot 14.

The tripod legs 15 are adjustable in length in a conventional manner by telescoping segments, which segments can be fixed as positioned by the various leg clamps 16.

In a conventional manner, the three tripod legs 15 converge upwardly and support at their top a vertical support post 17. Support post 17 is provided with an upper end 18.

Litter tray 12 is a conventional metal or plastic tray and it is provided with a central opening 20 which is properly sized to pass over support post 17 and support post base 21 so that the bottom of the tray will then rest on and be supported by the converging legs. The horizontal perch bar 13 is then secured to the upper end 18 of the vertical support post.

This is accomplished in the figure by drilling a perpendicular hole in the center of wood perch bar 13, partially through the bar 13 and properly sized to fit snugly over the upper tubular end of support post 18.

Cups 22 are screwed down to the outer ends of wooden perch bar 13 for providing water and feed to the animal or parrot 14 perched on the bar.

Accordingly, the animal perch may be very quickly assembled and disassembled and may be collapsed for easy storage when not in use. Additionally, it provides an alternative use for a camera tripod which is readily found in many homes.

As an alternative, the perch bar 13 may be secured in a different manner to the upper end 18 of tubular support post 17. For example, the conventional securing device that is found on such camera tripods may be utilized to secure the perch bar.

I claim:

1. An animal perch comprising: a camera tripod having three upwardly converging legs supporting a vertical support post above their point of convergence, said post having an upper end; a litter tray having a central opening sized for passing over said support post and resting on said converging legs for support below said post upper end; and horizontal perch bar means secured to said upper end of said post.

2. The animal perch of claim 1, including cup means secured to said perch bar.

3. A method of constructing an animal perch comprising the steps of: providing a conventional camera tripod having three upwardly conveying legs supporting a vertical support post above their point of convergence and said post having an upper end, providing a litter tray with a central opening sized for passing over said support post and resting on said converging legs for support, passing said opening over said post and thereby resting said tray on said converging legs, and securing horizontal perch bar means to said upper end of said post.

4. The method of claim 3, including the step of attaching a cup to said perch bar.

* * * * *